(12) United States Patent
Ishii

(10) Patent No.: US 12,496,732 B2
(45) Date of Patent: Dec. 16, 2025

(54) COMPUTATION DEVICE FOR CALCULATING PERMISSIBLE VALUE OF EXTERNAL FORCE ACTING ON ROBOT DEVICE OR WORKPIECE, AND DEVICE FOR CONTROLLING ROBOT

(71) Applicant: FANUC CORPORATION, Yamanashi (JP)

(72) Inventor: Yuki Ishii, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 137 days.

(21) Appl. No.: 18/262,577

(22) PCT Filed: Mar. 24, 2022

(86) PCT No.: PCT/JP2022/014108
§ 371 (c)(1),
(2) Date: Jul. 24, 2023

(87) PCT Pub. No.: WO2022/210291
PCT Pub. Date: Oct. 6, 2022

(65) Prior Publication Data
US 2024/0091957 A1  Mar. 21, 2024

(30) Foreign Application Priority Data
Mar. 31, 2021 (JP) ................................ 2021-060816

(51) Int. Cl.
*B25J 9/16* (2006.01)
*B25J 13/06* (2006.01)
(Continued)

(52) U.S. Cl.
CPC ............ *B25J 13/085* (2013.01); *B25J 9/1633* (2013.01); *B25J 13/06* (2013.01); *G06T 11/60* (2013.01); *G08B 21/182* (2013.01)

(58) Field of Classification Search
CPC ........ B25J 13/085; B25J 13/06; B25J 9/1633; G06T 11/60; G08B 21/182; G05B 2219/39505; G05B 2219/40223
See application file for complete search history.

(56) References Cited

U.S. PATENT DOCUMENTS

| 7,177,722 B2 * | 2/2007 | Kato ...................... B25J 9/1687 600/595 |
| 2020/0229679 A1 * | 7/2020 | Zhao ................ A61B 1/000094 |

(Continued)

FOREIGN PATENT DOCUMENTS

| DE | 60319787 T2 | 4/2009 |
| DE | 102018002732 A1 | 10/2019 |

(Continued)

*Primary Examiner* — Dalena Tran
(74) *Attorney, Agent, or Firm* — HAUPTMAN HAM, LLP

(57) ABSTRACT

This control device is provided with a processing unit for calculating a permissible value of an external force that is permissible to be applied on a robot, a workpiece, or a hand. The permissible value of load that can be exerted on a constituent member of the robot is determined in advance. The processing unit calculates a permissible value of an external force in an application direction in which the external force is applied, on the basis of the position and attitude of the robot, the position of an application point where the external force is applied, and the permissible value of load of the constituent member of the robot.

9 Claims, 9 Drawing Sheets

(51) Int. Cl.
  *B25J 13/08*     (2006.01)
  *G06T 11/60*     (2006.01)
  *G08B 21/18*     (2006.01)

(56) References Cited

U.S. PATENT DOCUMENTS

| 2021/0229279 A1* | 7/2021 | Colbrunn | B25J 13/088 |
| 2022/0032460 A1* | 2/2022 | Hosomi | B25J 9/1638 |
| 2023/0172676 A1* | 6/2023 | Mottram | B25J 9/1633 |
| | | | 600/1 |

FOREIGN PATENT DOCUMENTS

| JP | 2010-179443 A | 8/2010 |
| JP | 2016-168650 A | 9/2016 |
| JP | 2017-019039 A | 1/2017 |
| JP | 2019-202381 A | 11/2019 |

\* cited by examiner

COMPUTATION DEVICE FOR CALCULATING PERMISSIBLE VALUE OF EXTERNAL FORCE ACTING ON ROBOT DEVICE OR WORKPIECE, AND DEVICE FOR CONTROLLING ROBOT

RELATED APPLICATIONS

The present application is a National Phase of International Application No. PCT/JP2022/014108 filed Mar. 24, 2022, which claims priority to Japanese Application No. 2021-060816, filed Mar. 31, 2021.

TECHNICAL FIELD

The present invention relates to a calculation device for calculating an allowable value of an external force acting on a robot apparatus or a workpiece, and a robot controller.

BACKGROUND ART

In the related art, there is known a robot apparatus in which a hand for gripping a workpiece is attached to a robot and the robot changes its position and orientation, thereby transferring the workpiece to a predetermined position. As an operation of precisely adjusting the position and orientation of a workpiece when the workpiece is moved, the operation of bringing one workpiece into contact with another workpiece or fitting one workpiece to another workpiece is known.

It is known that a force sensor is attached to a robot in order for a robot apparatus to precisely adjust the position and orientation of a workpiece. The position and orientation of the robot can be adjusted based on a force output from the force sensor when one workpiece comes into contact with another workpiece. For example, it is known that in order to bring a surface of one workpiece and a surface of another workpiece into a state of being aligned with each other, a robot is driven based on a force acting on both workpieces (e.g., Japanese Unexamined Patent Publication No. 2017-19039A).

CITATION LIST

Patent Literature

[PTL 1] Japanese Unexamined Patent Publication No. 2017-19039A

SUMMARY OF INVENTION

Technical Problem

Attaching the force sensor to the robot allows detection of an external force acting on an action point set to the robot apparatus or workpiece. An operator can set, in an operation program, a target value of an external force in a predetermined direction, which acts on the action point by driving the robot. A robot controller can drive the robot so that the external force acting on the action point reaches the target value.

When an external force acts on the robot apparatus or the workpiece, a load is applied to constituent members, such as an arm, a motor, and a sensor, constituting the robot. For example, a bending force is applied to the constituent members, or a torque is applied to a rotation shaft. When a load applied to each constituent member exceeds an allowable value of the load, the constituent member may be damaged, or the robot may not be normally driven. Thus, it is preferable to control the robot so that the load applied to each constituent member is equal to or less than the allowable value.

In the prior art, a target value of an external force acting on the action point can be set to be low so that no abnormality occurs in the robot apparatus. For example, the magnitude of the external force that can act on the action point is calculated for each constituent member. The smallest value of an external force that can act on the action point in various positions and orientations of the robot can be determined as the allowable value of the external force. The target value of the external force can be set to a value equal to or less than the allowable value of the external force. In this way, the allowable value of the external force is set under the condition (worst condition) that the external force acting on the action point is minimized.

The range of such an allowable value of the external force is described in, for example, an operating manual. An operator sets the target value from the range of the allowable value. Thus, even when a large external force can act on the action point in a predetermined position and orientation of the robot, the robot is driven with a target value of a small external force. As a result, the operation time of the robot apparatus may be increased.

Alternatively, the robot controller performs control so that the robot is not driven in a state in which the external force acting on the action point exceeds the allowable value. For example, when the robot is in a driving state in which the external force exceeds the allowable value, the controller issues a warning and performs control of stopping the robot. However, in this control, it is necessary to perform recovery operation after the robot apparatus stops. As a result, there has been a problem that the cycle time is increased, and productivity is reduced.

Solution to Problem

A calculation device according to an aspect of the present disclosure includes a processing unit that calculates an allowable value of an external force that is allowed to act on a robot, a workpiece, or an operation tool. An allowable value of a load that can be applied to a constituent member of the robot is determined in advance. The processing unit calculates the allowable value of the external force in an acting direction in which the external force acts, based on a position and orientation of the robot, a position of an action point where the external force acts, and the allowable value of the load on the constituent member of the robot.

A robot controller according to an aspect of the present disclosure includes the above-described calculation device and an operation control unit that controls an operation of the robot.

Advantageous Effect of Invention

According to an aspect of the present disclosure, it is possible to provide a calculation device for calculating an allowable value of an external force acting on a robot apparatus or a workpiece, and a robot controller.

DESCRIPTION OF EMBODIMENTS

With reference to FIG. 1 to FIG. 9, a calculation device and a robot controller including the calculation device according to an embodiment are described. The calculation device of the present embodiment calculates an allowable value of an external force applied to a robot apparatus or a workpiece gripped by the robot apparatus.

Figure 1:
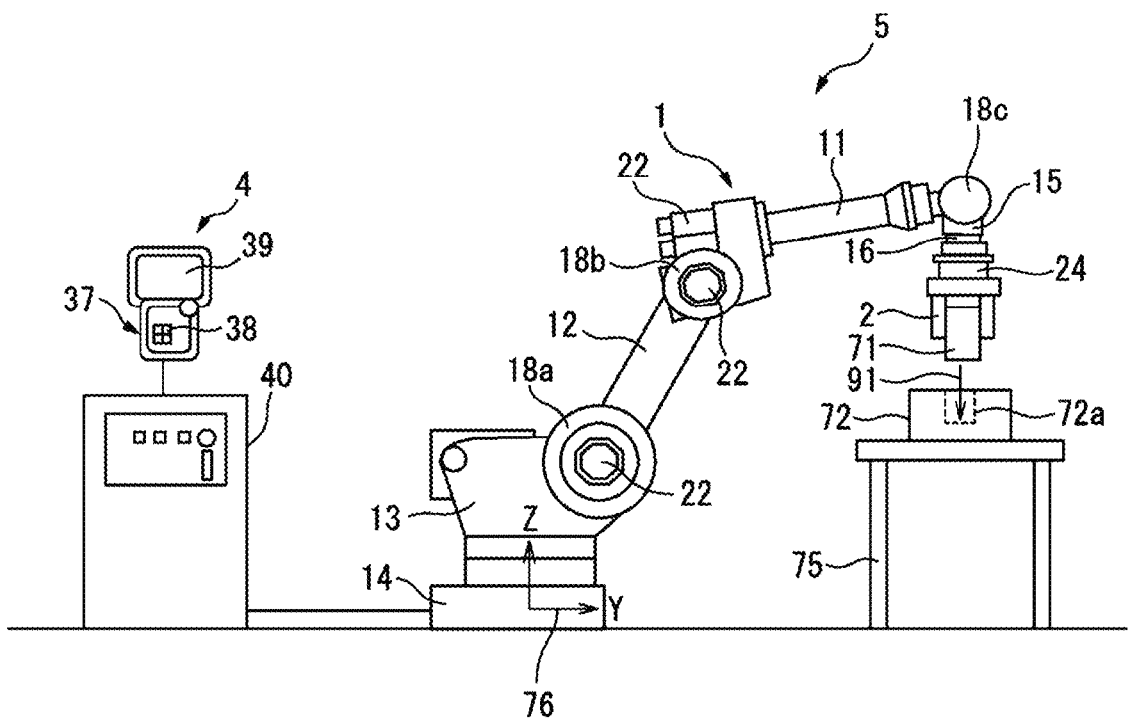
FIG. 1 is a schematic view of a robot apparatus according to an embodiment.

FIG. 1 is a schematic view of the robot apparatus according to the present embodiment. A robot apparatus 5 includes a hand 2 as an operation tool and a robot 1 that moves the hand 2. The robot 1 of the present embodiment is an articulated robot including a plurality of joints 18a, 18b, and 18c. The robot 1 includes a plurality of movable constituent members. The constituent members of the robot 1 are formed so as to rotate about respective drive axes.

The robot 1 of the present embodiment includes a base 14 and a turning base 13 that rotates with respect to the base 14. The robot 1 includes an upper arm 11 and a lower arm 12. The lower arm 12 is rotatably supported by the turning base 13. The upper arm 11 is rotatably supported by the lower arm 12. The robot 1 includes a wrist 15 rotatably supported by the upper arm 11. The hand 2 is fixed to a flange 16 of the wrist 15. Further, the upper arm 11 or the flange 16 rotates about a predetermined drive axis.

The robot of the present embodiment has six drive axes; however, the embodiment is not limited to this. A robot that changes its position and the orientation by any mechanism can be employed. The operation tool of the present embodiment is the hand having two claw parts; however, the embodiment is not limited to this. Any device suitable for the operation performed by the robot apparatus can be employed as the operation tool.

A reference coordinate system 76 is set in the robot apparatus 5 of the present embodiment. The reference coordinate system 76 is also referred to as a world coordinate system. The reference coordinate system 76 is a coordinate system in which the position of an origin is fixed, as is also the direction of the coordinate axis. In the robot apparatus 5, a tool coordinate system having an origin set at any position of the operation tool is set. In the present embodiment, the origin of the tool coordinate system is set at a tool center point which is an middle point between tips of the two claw parts of the hand 2. The tool coordinate system is a coordinate system whose position and orientation are changed with the operation tool. The position of the robot 1 corresponds to the position of the origin of the tool coordinate system in the reference coordinate system 76. The orientation of the robot 1 corresponds to the direction of the tool coordinate system with respect to the reference coordinate system 76.

Figure 2:
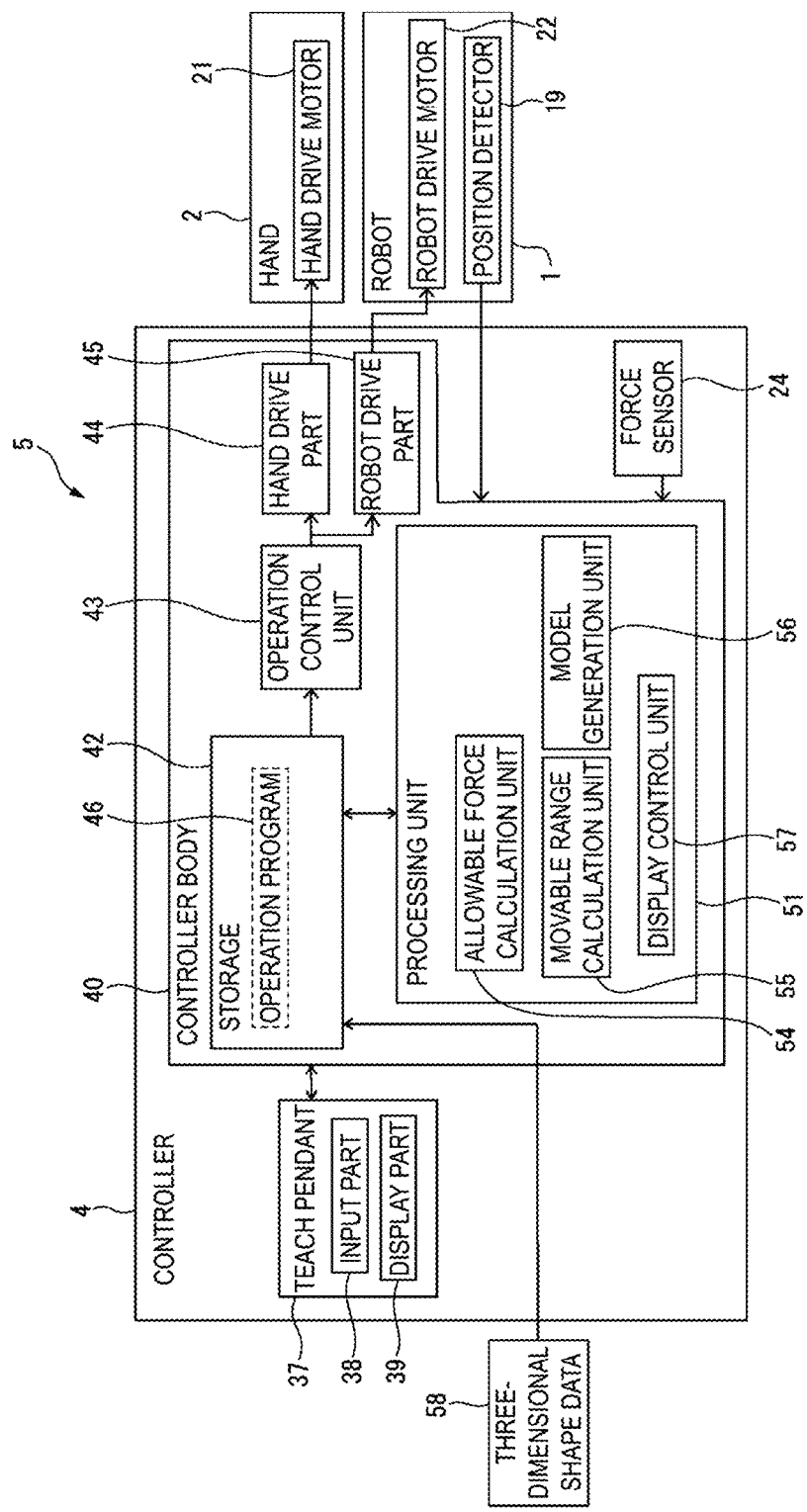
FIG. 2 is a block diagram of the robot apparatus according to the embodiment.

FIG. 2 illustrates a block diagram of the robot apparatus according to the present embodiment. Referring to FIG. 1 and FIG. 2, the robot 1 includes a robot drive device that changes the position and orientation of the robot 1. The robot drive device includes a robot drive motor 22 that drives constituent members such as the arm and the wrist. In the present embodiment, a plurality of robot drive motors 22 are arranged corresponding to the respective drive axes.

The robot apparatus 5 includes a hand drive device that drives the hand 2. The hand drive device includes a hand drive motor 21 that drives the claw part of the hand 2. The claw part of the hand 2 is opened or closed by driving the hand drive motor 21. It should be noted that the hand may be formed so as to be driven by air pressure or the like.

The robot apparatus 5 includes a controller 4 that controls the robot 1 and the hand 2. The controller 4 includes a controller body 40, and a teach pendant 37 for an operator to operate the controller body 40. The controller body 40 includes an arithmetic processing device (computer) having a central processing unit (CPU) serving as a processor. The arithmetic processing device includes a random access memory (RAM) and a read only memory (ROM), or the like, connected to the CPU via a bus.

The teach pendant 37 is connected to the controller body 40 via a communication device. The teach pendant 37 includes an input part 38 that inputs information on the robot 1 and the hand 2. The input part 38 includes input members such as a keyboard and a dial. The teach pendant 37 includes a display part 39 that displays information related to the robot 1 and the hand 2. The display part 39 can include any display panel such as a liquid crystal display panel or an organic electroluminescence (EL) display panel. It should be noted that when the teach pendant includes a touch panel type display panel, the display panel functions as an input part and a display part.

An operation program 46 generated in advance is input to the controller 4 in order to operate the robot 1 and the hand 2. Alternatively, the operator can set a teaching point of the robot 1 by operating the teach pendant 37 and driving the robot 1. The controller 4 can generate the operation program 46 based on the teaching point.

The controller body 40 includes an operation control unit 43 that controls operations of the robot 1 and the hand 2. The operation control unit 43 sends an operation command for driving the robot 1 to a robot drive part 45. The robot drive part 45 includes an electrical circuit that drives the robot drive motor 22. The robot drive part 45 supplies electricity to the robot drive motor 22 according to the operation command. The operation control unit 43 also sends an operation command for driving the hand 2 to a hand drive part 44. The hand drive part 44 includes an electrical circuit that drives the hand drive motor 21. The hand drive part 44 supplies electricity to the hand drive motor 21 according to the operation command.

The controller body 40 includes a storage 42 that stores information related to the control of the robot 1 and the hand 2. The storage 42 can include a non-transitory storage medium that can store information. For example, the storage 42 can include a storage medium such as a volatile memory, a nonvolatile memory, a magnetic storage medium, or an optical storage medium. The operation program 46 is stored in the storage 42.

The operation control unit 43 corresponds to a processor that is driven according to the operation program 46. The processor is formed so as to read information stored in the storage 42. The processor reads the operation program 46 and performs control of the robot 1 and the hand 2 as determined in the operation program 46, thereby functioning as the operation control unit 43. Alternatively, the processor functions as the operation control unit 43 by driving the robot 1 and the hand 2 based on the operation of the input part 38 of the teach pendant 37.

The robot 1 includes a state detector for detecting the position and orientation of the robot 1. The status detector according to the present embodiment includes a position detector 19 that is attached to the robot drive motor 22 on each drive axis and detects a rotational position. The position detector 19 can include an encoder that detects the rotation angle of an output shaft of the robot drive motor 22. In the present embodiment, the position and orientation of the robot 1 are detected based on outputs of a plurality of the position detectors 19.

The controller 4 includes a force sensor 24 as a force detector attached to the robot 1. The force sensor 24 of the present embodiment is a six-axis sensor. In the robot apparatus 5 of the present embodiment, the force sensor 24 is arranged between the flange 16 and the hand 2. The force sensor 24 detects an external force including a force and a moment acting on a workpiece 71. As the force sensor 24, an arbitrary force sensor such as a sensor including a strain sensor or a capacitance type sensor can be employed.

In the force sensor 24 according to the present embodiment, a sensor coordinate system for detecting the forces acting on the sensor is set. The forces detected by the force sensor 24 include the forces in directions of three axes orthogonal to one another in the sensor coordinate system and forces around the three axes. More specifically, the force sensor 24 detects the forces in directions of three orthogonal axes (X-axis, Y-axis, and Z-axis) and moments (Mx, My, and Mz) as the forces in directions of axes (W-axis, P-axis, and R-axis) around the three axes.

Figure 3:
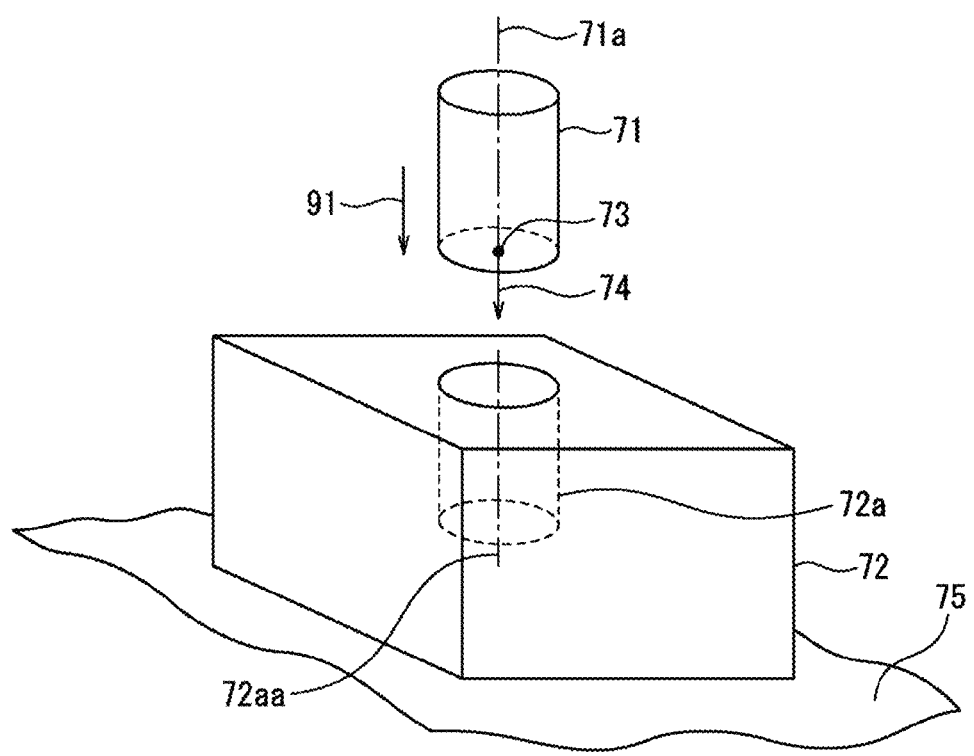
FIG. 3 is an enlarged perspective view of workpieces when a first workpiece is fitted into a second workpiece.

FIG. 3 illustrates an enlarged perspective view of a first workpiece and a second workpiece according to the present embodiment. Referring to FIG. 1 and FIG. 3, the robot apparatus 5 performs control of fitting the first workpiece 71 into a second workpiece 72. When the robot 1 is driven, the robot apparatus 5 moves the first workpiece 71 toward the second workpiece 72. Subsequently, the first workpiece 71 is fitted into a recess 72a of the second workpiece 72 as indicated by an arrow 91.

The first workpiece 71 of the present embodiment has a cylindrical shape. An end face of the first workpiece 71 is flat. The second workpiece 72 has a rectangular parallelepiped shape. The second workpiece 72 is fixed to a work table 75. The recess 72a of the second workpiece 72 is formed in a cylindrical shape. The recess 72a has a shape corresponding to the shape of the first workpiece 71 so that the first workpiece 71 fits into the recess 72a.

The controller 4 performs control of fitting the workpiece 71 having a cylindrical shape into the recess 72a of the workpiece 72. At this time, when a central axis 71a of the workpiece 71 and a central axis 72aa of the recess 72a are on the same line, the workpiece 71 is smoothly inserted into the recess 72a of the workpiece 72. However, the position or orientation of the central axis 71a may be shifted with respect to the central axis 72aa.

Referring to FIG. 2 and FIG. 3, the controller 4 performs force control based on the output of the force sensor 24 when the workpiece 71 is fitted into the recess 72a. In the present embodiment, control of adjusting the position and orientation of the robot based on the force detected by the force detector is referred to as force control. In the force control, the force generated when the workpieces come into contact with each other is used.

Based on the force detected by the force sensor 24 serving as the force detector, the controller 4 can perform control of changing the speed in a direction orthogonal to a direction in which the workpiece moves and control of changing the direction of the workpiece. The controller 4 can perform, for example, compliance control, impedance control, or the like based on the force detected by the force sensor 24.

When such force control is performed, a control point serving as a reference of the force control and a movement direction (vector) for moving the workpiece by the robot are required. The control point corresponds to an action point where an external force acts on the robot apparatus 5 or the workpiece 71. In the robot apparatus 5 of the present embodiment, a workpiece tip point 73 is determined in advance as the control point on the end surface of the first workpiece 71. The workpiece tip point 73 is arranged at the center of a circle having a planar shape on the end surface of the first workpiece 71. When the workpiece 71 is fitted into the recess 72a, a direction indicated by an arrow 74 is set in advance as the movement direction of the workpiece 71 supported by the robot 1. The force sensor 24 detects an external force acting on the action point.

The robot apparatus 5 of the present embodiment includes a calculation device that calculates an allowable value of an external force. In the present embodiment, the controller body 40 of the controller 4 functions as the calculation device. The controller body 40 includes a processing unit 51 that performs arithmetic processing. The processing unit 51 includes an allowable force calculation unit 54 that calculates an allowable value of an external force that is allowed to act on the robot, the workpiece, or the operation tool. The processing unit 51 includes a movable range calculation unit 55 that calculates a region of the position of the action point where the current target value of the external force is equal to or less than the allowable value when the position and orientation of the robot 1 are changed. The processing unit 51 includes a model generation unit 56 that generates a model of the robot apparatus and a model of the workpiece based on three-dimensional shape data 58 of the robot apparatus and the workpiece. The processing unit 51 includes a display control unit 57 that controls an image displayed on the display part 39 of the teach pendant 37.

The operation program 46 includes a program for performing a calculation regarding the allowable value of the external force or generating a model of the constituent member of the robot apparatus. The processing unit 51 corresponds to a processor that is driven according to the operation program 46. The processor functions as the processing unit 51 by performing control determined in the operation program 46. Further, each unit of the allowable force calculation unit 54, the movable range calculation unit 55, the model generation unit 56, and the display control unit 57 corresponds to a processor that is driven according to the operation program 46. The processor functions as each unit by performing the control determined in the operation program 46.

The operation control unit 43 performs force control according to the operation program 46. The operation control unit 43 acquires the output of the force sensor 24. Based on the output of the force sensor 24, the operation control unit 43 calculates an external force in an acting direction determined in advance at the workpiece tip point 73 as an action point. For example, the operation control unit 43 sets an axis in the movement direction indicated by an arrow 74 and an axis orthogonal to the movement direction. The operation control unit 43 calculates the forces applied in the directions of these axes and the moments around the axes as the external force acting on the workpiece tip point 73.

The operation control unit 43 can control the operation of the robot 1 so that the external force acting on the workpiece tip point 73 reaches a target value determined in advance. For example, when the workpiece 71 is moved in the movement direction indicated by the arrow 74 and comes into contact with the workpiece 72, the operation control unit 43 controls the position and orientation of the robot 1 so that a force acting in a direction opposite to the movement direction indicated by the arrow 74 reaches the target value. In other words, the operation control unit 43 controls the position and orientation of the robot 1 so that the force pressing the workpiece 71 in the direction indicated by the arrow 74 reaches the target value. In addition to the above, the operation control unit 43 controls the robot 1 so that the forces in the directions of the axes perpendicular to the direction indicated by the arrow 74 and the moments around these axes reach the target values determined in advance.

In this way, the operation control unit 43 can perform force control of controlling the operation of the robot so that an external force acting on an action point in a predetermined acting direction reaches the target value. By performing the force control, it is possible to perform fitting work while correcting the position and orientation of the first workpiece 71 with respect to the recess 72a. Such a target value of the external force is set in the operation program 46 as a parameter for performing the force control.

In the robot apparatus 5 of the present embodiment, when the fitting work is performed, the first workpiece 71 comes into contact with the second workpiece 72 serving as another object. Subsequently, the position and orientation of the workpiece 71 are adjusted based on an external force acting on the workpiece 71.

While the workpiece 71 is in contact with the workpiece 72, a load is applied to the hand 2 and the constituent members of the robot 1. For example, a tensile force, a compressive force, a bending moment, a torsional moment, or the like is applied as a load to each of the constituent members such as the upper arm 11, the lower arm 12, the tuning base 13, and the wrist 15. A torque around the rotation axis is further applied as a load to the constituent members such as the robot drive motor 22 and a reduction gear arranged in each of the joints 18a, 18b, and 18c. When torque sensors are arranged as constituent members at the joints 18a, 18b, and 18c, a torque is applied as a load to the torque sensors.

An allowable value of a load that can be applied to the constituent member of the robot 1 is determined in advance. When the load on the constituent member exceeds the allowable value, an abnormality may occur in each constituent member. For example, the constituent member may be damaged or may not function properly. As a result, the robot apparatus may not operate normally.

The robot apparatus is preferably driven so that the load applied to the constituent member is equal to or less than the allowable value. Particularly, the robot is preferably driven so that the load acting on each constituent member does not exceed a physical allowable value or a mechanical allowable value. The physical allowable value corresponds to an allowable value of a torsional moment, a bending moment, a compressive force, a tensile force, or the like acting on the constituent member such as an arm. The mechanical allowable value corresponds to an allowable value of a torque, a compressive force, or the like acting on the constituent member including a plurality of parts such as a bearing and a reduction gear. In relation to the load acting on each constituent member, it is also preferable to take into account a function of safely driving the robot. An allowable value in terms of the safety function corresponds to an allowable value for stopping the robot when the robot comes into contact with another object.

When the first workpiece 71 gripped by the robot apparatus 5 is pressed against the second workpiece 72, the load applied to each constituent member is preferably controlled to be equal to or less than the allowable value. A load corresponding to the force when the first workpiece 71 is pressed against the second workpiece is generated in each constituent member. The larger the external force acting on the action point when the first workpiece 71 is pressed against the second workpiece 72 by the robot apparatus 5, the larger the load applied to the constituent member. Thus, the target value of the external force is preferably set to an appropriate value so that the force acting on the workpiece tip point 73 does not become too large.

Figure 4:
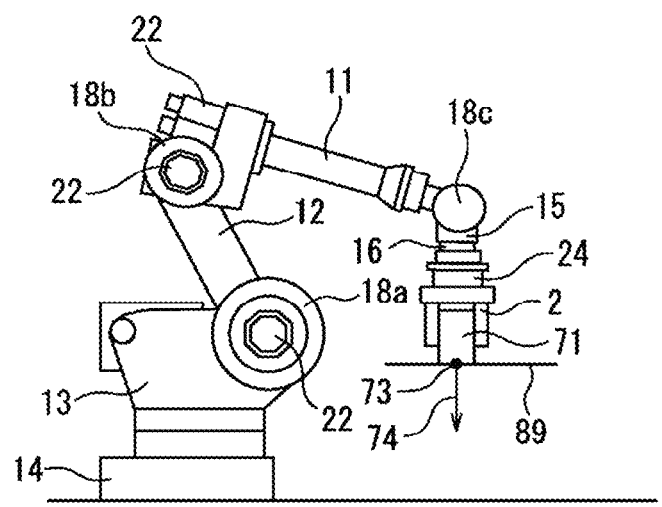
FIG. 4 is a schematic view of the robot apparatus when a robot is in a first position and orientation.
Figure 5:
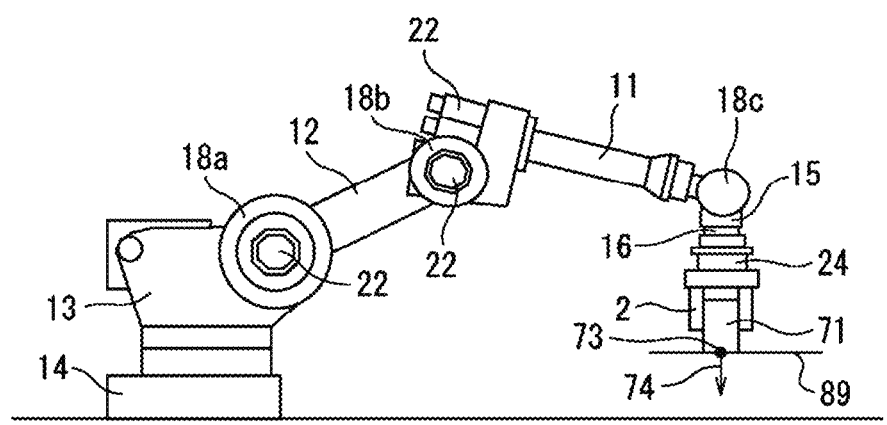
FIG. 5 is a schematic view of the robot apparatus when the robot is in a second position and orientation.

FIG. 4 illustrates a schematic view of the robot apparatus when the robot is in a first position and orientation. FIG. 5 illustrates a schematic view of the robot apparatus when the robot is in a second position and orientation. FIG. 4 and FIG. 5 illustrate a contact surface 89 with which the first workpiece 71 comes into contact. The contact surface 89 corresponds to a surface of an object against which the first workpiece 71 is pressed. The robot 1 presses the first workpiece 71 toward the contact surface 89 with a constant force along the movement direction indicated by the arrow 74. In other words, the external force acting on the workpiece tip point 73 is the same between the first position and orientation and the second position and orientation.

The torque applied to the constituent member such as the torque sensor arranged at the joint 18a depends on the external force acting on the workpiece tip point 73 and a distance from the workpiece tip point 73 to the drive axis of the joint 18a. A distance from the drive axis of the joint 18a to the workpiece tip point 73 in the second position and orientation is larger than a distance from the drive axis of the joint 18a to the workpiece tip point 73 in the first position and orientation. Thus, regarding the torque applied to the constituent member arranged at the joint 18a, the torque in the second position and orientation is larger than the torque in the first position and orientation. Further, regarding the bending moment and the like acting on the lower arm 12, the bending moment in the second position and orientation is larger than the bending moment in the first position and orientation.

In this way, even though the external forces acting on the action point have the same magnitude, the load acting on the constituent member of the robot apparatus changes in response to the position and orientation of the robot. In this example, at the position and orientation of the robot where the position of the workpiece tip point 73 is farthest from the drive axis of the joint 18a, the torque applied to the constituent member arranged at the joint 18a is maximized.

In the prior art, a constant allowable value of external force is determined so that the load acting on the constituent member of the robot apparatus is equal to or less than the allowable value in various positions and orientations of the robot. For example, as illustrated in FIG. 5, when the upper arm 11 and the lower arm 12 are in a largely extended state, the allowable value of the external force is set so that the torque applied to the joint 18a is equal to or less than the allowable value. For this reason, a small allowable value of external force is set. Since the target value of the external force is determined based on the allowable value of the external force, a small value is employed as the target value of the external force. For example, in the first position and orientation illustrated in FIG. 4, a large external force can be applied to the workpiece tip point 73, but the robot is driven with a small target value of external force set based on the second position and orientation illustrated in FIG. 5. As a result, the operation time of the robot apparatus may be increased.

Referring to FIG. 2, the controller 4 according to the present embodiment calculates an allowable value of an external force in response to a state in which the robot apparatus is driven. Based on the position and orientation of the robot, the allowable force calculation unit 54 of the processing unit 51 calculates an allowable value of an external force that can be applied to the action point. Further, based on the position of the action point where the external force acts and the allowable value of the load on the constituent member of the robot, the allowable force calculation unit 54 calculates the allowable value of the external force in the acting direction in which the external force acts. In the present embodiment, when the force control is performed, the allowable value of the external force acting on the workpiece tip point 73 is calculated.

The operator can acquire an allowable value of an external force at the time of teaching operation. The operator manually operates the robot 1 so that the first workpiece 71 comes into contact with a surface of the second workpiece 72. In the present embodiment, the operator changes the position and orientation of the robot by operating the teach pendant 37 so that the first workpiece 71 comes into contact with the second workpiece 72.

The allowable force calculation unit 54 acquires the position and orientation of the robot based on the output of the position detector 19. The allowable force calculation unit 54 acquires the position of the workpiece tip point 73 as the action point where the external force acts. The workpiece tip point 73 moves together with the first workpiece 71 and the hand 2.

When the position and orientation of the robot are determined, the robot apparatus 5 is calibrated so that the position of the workpiece tip point 73 can be calculated. For example, the position of the workpiece tip point 73 is determined in advance by the coordinate values of the tool coordinate system. Alternatively, it is possible to set a flange coordinate system having an origin at the flange 16 of the robot 1 and moving together with the flange 16. The position of the workpiece tip point 73 can be determined in advance in the flange coordinate system. The allowable force calculation unit 54 can calculate the position of the workpiece tip point 73 in the reference coordinate system 76 based on the position of the workpiece tip point 73 in the tool coordinate system or the flange coordinate system and the position and orientation of the robot 1. Based on the output of the force sensor 24, the allowable force calculation unit 54 also detects the acting direction in which the external force acts. Alternatively, a direction determined in advance may be employed as the acting direction of the external force.

Next, when the magnitude of the external force acting on the workpiece tip point 73 and the acting direction of the external force are determined, it is possible to calculate the load applied to each constituent member of the robot 1. Constants necessary for calculating the load, such as the shape, dimension, and weight of each constituent member, are stored in the storage 42 in advance. The position and orientation of each constituent member such as an arm can be calculated based on the position and orientation of the robot 1. The positions of the joints 18a, 18b, and 18c can be calculated from the position and orientation of the robot 1.

Based on an external force and an acting direction of the external force determined in advance, the allowable force calculation unit 54 can calculate loads, such as a tensile force, a compressive force, a bending moment, and a torsional moment, on constituent members such as the upper arm 11 and the lower arm 12. The allowable force calculation unit 54 can also calculate a torque applied to the constituent members arranged at the respective joints 18a, 18b, and 18c. A calculation method of each load is determined in advance and stored in the storage 42. Based on the position and orientation of each constituent member, the allowable force calculation unit 54 can calculate the load applied to the constituent member.

The allowable force calculation unit 54 calculates the load applied to the constituent member while gradually increasing, from a small initial value, the external force applied to the workpiece tip point 73 in an acting direction determined in advance. For example, the allowable force calculation unit 54 gradually increases the external force applied to the workpiece tip point 73 from zero by an increase amount determined in advance in the movement direction indicated by the arrow 74. The allowable force calculation unit 54 calculates a load applied to each constituent member of the robot apparatus. Subsequently, the allowable force calculation unit 54 detects that the load on at least one of the plurality of constituent members exceeds the allowable value of the load. Based on the external force at this time, the allowable force calculation unit 54 can determine an allowable value of the external force at which the loads on all the constituent members are within the allowable value. For example, when the external force applied to the workpiece tip point 73 is gradually increased, the allowable force calculation unit 54 can determine, as the allowable value of the external force, a maximum value of the external force when the loads on all the constituent members are within the allowable value.

In this way, an allowable value of an external force acting on an action point can be calculated in response to the position of an action point, an acting direction in which the external force acts, and the position and orientation of the robot. The calculation direction of the allowable value of the external force is not limited to the above embodiment. The allowable value of the external force can be calculated by an arbitrary method so that loads on all the constituent members do not exceed the allowable value.

For example, the allowable force calculation unit 54 acquires an allowable value of a load that can be applied to each constituent member. Based on the position and orientation of the robot, the allowable force calculation unit 54 calculates an allowable value of an external force that can be applied in an acting direction at the workpiece tip point 73 from the allowable value of the load on the constituent member. The allowable force calculation unit 54 calculates the allowable value of the external force at the workpiece tip point 73 with respect to the allowable values of the loads on all the constituent members. The allowable force calculation unit 54 can employ the smallest allowable value of the external force, among the allowable values of external forces with respect to the allowable values of the loads on all the constituent members, as the allowable value of the external force that can be applied to the workpiece tip point 73.

The display control unit 57 displays the allowable value of the external force calculated by the allowable force calculation unit 54 on the display part 39 of the teach pendant 37. The operator can determine the target value of the external force when the force control is performed by looking at the allowable value of the external force. The target value of the external force can be set to be equal to or less than the allowable value of the external force. For example, the operator can employ a value slightly smaller than the allowable value of the external force as the target value of the external force. The operator can set the target value of the external force in the operation program.

The allowable value of the external force calculated by the processing unit 51 in the present embodiment is based on the position and orientation of the robot, the allowable value of the load on each constituent member, the position of an action point where the external force acts, and the direction in which the external force acts. Thus, the target value of the external force that can be applied to the workpiece by the robot apparatus can be set in response to the state of the robot. Particularly, the target value of the external force according to the position and posture of the robot can be set. As a result, it is possible to avoid setting the target value of the external force to be small by including all positions and orientations of the robot. Alternatively, it is possible to avoid automatic stop of the robot apparatus due to an excessively large target value of the external force.

For example, in a specific position and orientation of the robot as illustrated in FIG. 4, it is possible to set a target value of an external force to be larger than that in the prior art or to drive the robot with an allowable value of an external force larger than that in the prior art. As a result, it is possible to shorten the operation time of the robot apparatus. In the work of fitting the workpieces according to the present embodiment, the force of pressing the first workpiece 71 against the second workpiece 72 can be increased, so that the work of fitting the workpieces can be performed in a shorter time than in the prior art.

The operation control unit 43 of the present embodiment can control the operation of the robot so that the magnitude of the external force acting on the action point is equal to or less than the allowable value of the external force. For example, the operation control unit 43 of the present embodiment can control the operation of the robot 1 so that the external force acting on the workpiece tip point 73 reaches a target value of the external force. Alternatively, an allowable value of the external force acting on the action point may be set in the operation program. The operation control unit calculates an external force acting on the action point based on the output of the force sensor during a period in which the robot is driven. When the external force acting on the action point approaches the allowable value, the operation control unit can control the driving state of the robot such as the operating speed of the robot or the position and orientation of the robot so that the force acting on the action point is reduced.

Figure 6:
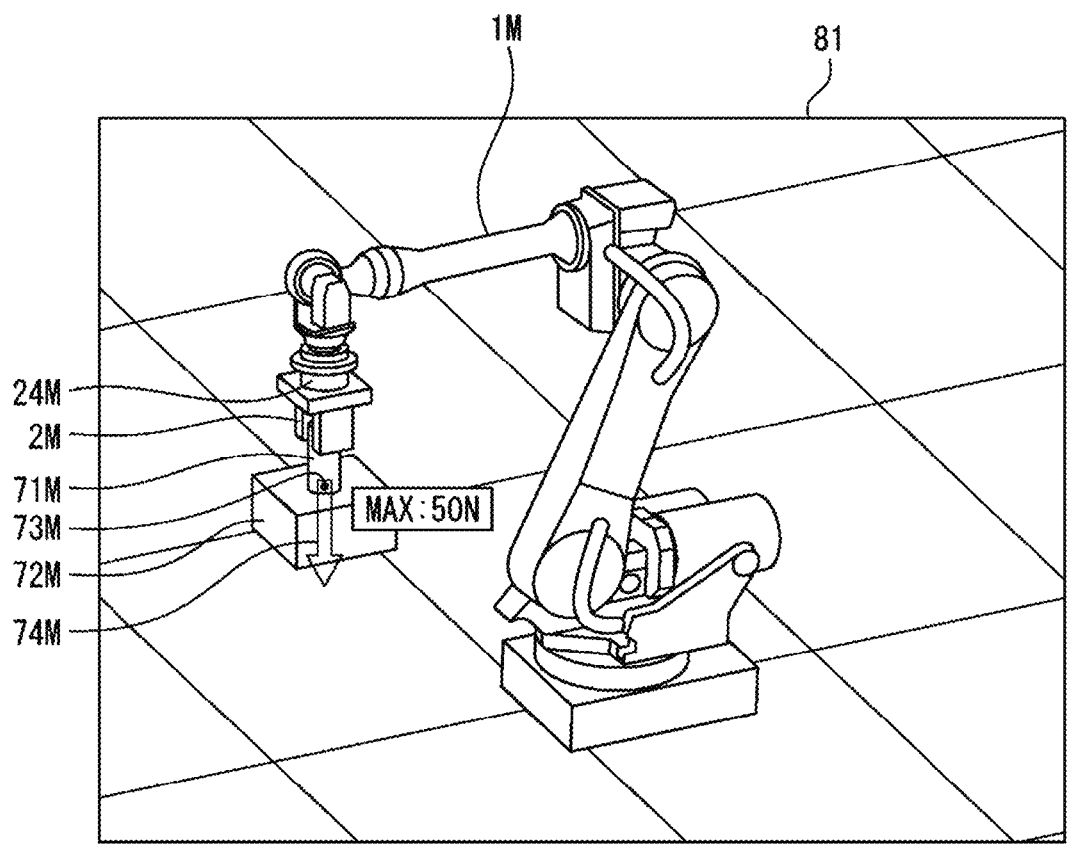
FIG. 6 is a first image displayed on a display part of a teach pendant.

FIG. 6 illustrates a first image displayed on the display part of the teach pendant according to the present embodiment. Referring to FIG. 2 and FIG. 6, the three-dimensional shape data 58 of the constituent members constituting the robot apparatus and the workpiece are generated in advance. Data output from, for example, a computer-aided design (CAD) device can be used as the three-dimensional shape data 58. The three-dimensional shape data 58 are stored in the storage 42. Actual positions of the first workpiece 71 and the second workpiece 72 with respect to the robot apparatus 5 are determined and set in advance.

The model generation unit 56 generates three-dimensional models of the robot apparatus, the workpiece, and the like based on three-dimensional shape data of the robot apparatus and three-dimensional shape data of the workpiece. The model generation unit 56 acquires the position and orientation of the robot 1 based on the output of the position detector 19. A three-dimensional model corresponding to the position and orientation of the robot is generated. The model generation unit 56 arranges the model in a virtual space in response to an actual position of the robot apparatus and an actual position of the workpiece.

The display control unit 57 displays an image of the model generated by the model generation unit 56 on the display part 39. The display control unit 57 generates an image of the model when viewed from a predetermined direction. In a first image 81, a model 1M of the robot, a model 24M of the force sensor, a model 2M of the hand, a model 71M of the first workpiece, and a model 72M of the second workpiece are displayed. When the operator changes the position and orientation of the robot by using the teach pendant or the like, the position and orientation of the model 1M of the robot in the image 81 are also changed.

In this regard, the display control unit 57 of the present embodiment can display the allowable value of the external force calculated by the allowable force calculation unit 54 so as to be superimposed on the image of the robot 1. In the image 81, a model 73M of the workpiece tip point and an arrow 74M indicating the acting direction of the external force are displayed. Next to the arrow 74M, the allowable value of the external force that can be applied to the workpiece tip point as an action point is displayed as "MAX:50N". In other words, it is displayed that the allowable value of the external force is 50N in the current position and orientation of the robot. When the position and orientation of the robot are changed, the allowable value of the external force is also changed.

The operator can determine the target value of the external force when the force control is performed by looking at the image 81. For example, the operator can set the same value as the allowable value of the external force in the operation program 46 as the target value. Alternatively, the processing unit 51 may automatically set the target value of the external force in the operation program 46 based on the allowable value of the external force calculated by the allowable force calculation unit 54. As the target value of the external force, a value equal to or less than the allowable value of the external force can be set.

The allowable value of the external force may also be set in the operation program. In this case, the operator can set, in the operation program, the allowable value of the external force calculated by the allowable force calculation unit 54. Alternatively, the processing unit 51 may automatically set, in the operation program, the allowable value of the external force calculated by the allowable force calculation unit 54.

In the image 81, the display part 39 indicates the allowable value of the external force by a number beside the arrow indicating the acting direction of the external force; however, the embodiment is not limited to this. The display part may indicate the magnitude of the allowable value of the external force by the length of the arrow. For example, the display part can display a longer arrow as the allowable value of the external force is increased.

Figure 7:
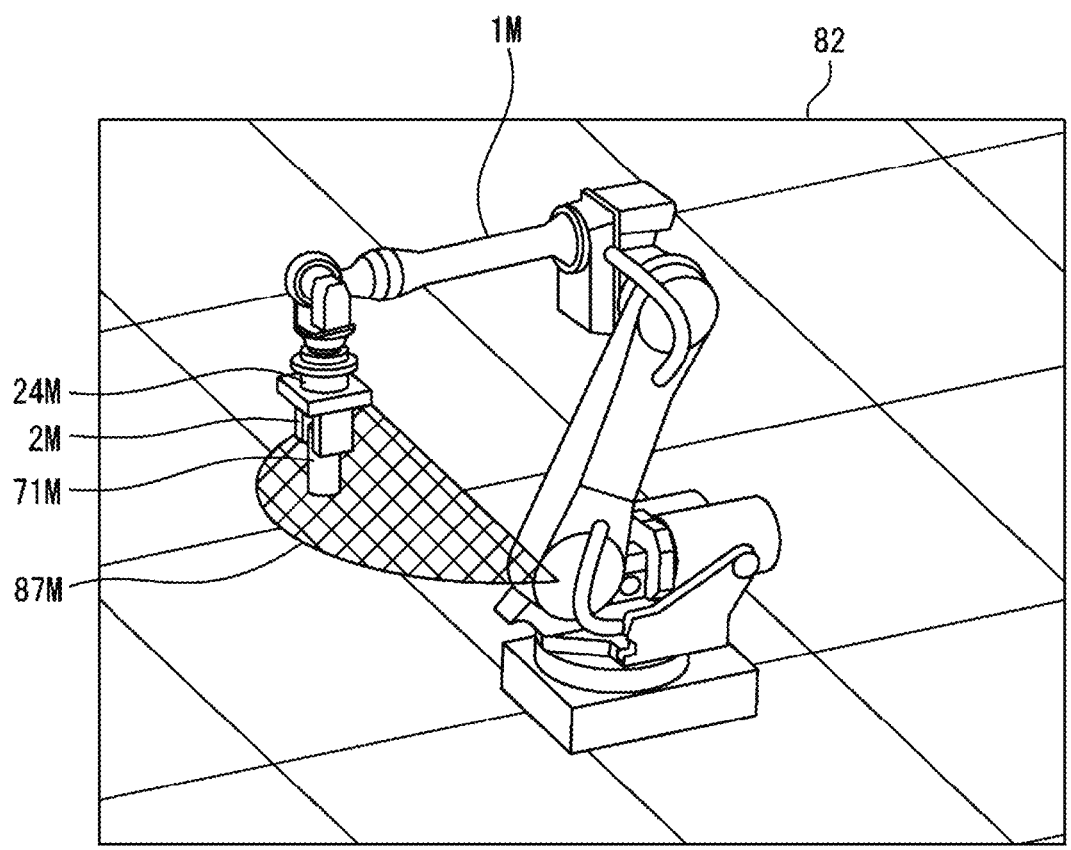
FIG. 7 is a second image displayed on the display part of the teach pendant.

FIG. 7 illustrates a second image displayed on the display part of the teach pendant. In a second image 82, the model 1M of the robot, the model 24M of a vision sensor, the model 2M of the hand, and the model 71M of the first workpiece are displayed. Referring to FIG. 2 and FIG. 7, the movable range calculation unit 55 calculates a region 87M of the position of an action point where a current target value of the external force is equal to or less than the allowable value of an external force when the position and orientation of the robot are changed. In other words, the movable range calculation unit 55 calculates the region 87M, where the position and orientation of the robot can be changed, with the target value of the external force determined in advance. The region 87M is a range in which an action point is movable. The display control unit 57 displays the region 87M so as to be superimposed on the image of the robot.

In this example, the region 87M where the action point is movable is shown in a plane in which a height from an installation surface of the robot 1 to the action point is constant. It should be noted that the region in which the action point is movable may be searched for and displayed in a three-dimensional region.

The movable range calculation unit 55 acquires a current position of the action point. For example, the movable range calculation unit 55 acquires the current position of the action point in the reference coordinate system 76. In the present case, a plane having a constant height from the installation surface is considered as the movable range of the action point. The movable range calculation unit 55 moves the position of the workpiece tip point serving as the action point in the plane for each direction determined in advance and distance determined in advance. Subsequently, the allowable force calculation unit 54 calculates the allowable value of the external force at the position of each action point.

When the allowable value of the external force is equal to or larger than the target value of the external force currently set, the movable range calculation unit 55 determines that the action point is movable to the position. On the other hand, when the allowable value of the external force is less than the target value of the external force currently set, the movable range calculation unit 55 determines that the action point is not movable to the position.

The movable range calculation unit 55 performs control of moving the position of the action point little by little. The movable range calculation unit 55 can calculate a region of the position of the action point where the allowable value of the external force is equal to or larger than the target value of the external force. The display control unit 57 can acquire a position to which the action point can be moved from the movable range calculation unit 55, and display the region 87M. The operator can confirm, in the image 82, a range in which the action point can be moved. The operator can easily ascertain a range in which the current target value of the external force can be employed. In this way, the operator can set the target value of the external force when the force control is performed while manually driving the robot apparatus 5 with the teach pendant 37.

Subsequently, the controller 4 according to the present embodiment is formed so that the target value of the external force can be automatically set or changed based on the position and orientation of the robot when the force control is performed. Referring to FIG. 2, the allowable force calculation unit 54 of the processing unit 51 acquires the position and orientation of the robot based on the output of the position detector 19 during the period in which the force control is performed. The allowable force calculation unit 54 calculates the current allowable value of the external force based on the current position and orientation of the robot. The allowable force calculation unit 54 can calculate the allowable value of the external force for each interval determined in advance. Alternatively, when the force control is performed, the allowable value of the external force may be calculated by using one position and one orientation of the robot.

Based on the allowable value of the external force, the processing unit 51 calculates a target value of the external force when the force control is performed. For example, the processing unit 51 can set the allowable value of the external force to the target value of the external force. Alternatively, the processing unit 51 may set the target value of the external force by multiplying the allowable value of the external force by a predetermined constant less than 1. The processing unit 51 sends the target value of the external force set based on the allowable value of the external force to the operation control unit 43. The operation control unit 43 can perform force control of bringing the first workpiece into contact with another object based on the acquired target value of the external force. By performing such control, it is possible to set or change the target value of the external force in response to the position and orientation of the robot during the period in which the robot apparatus performs predetermined operation. Since the work can be performed at an optimum target value of the external force, the operation time can be shortened.

In this regard, when the operator sets the target value of the external force in the operation program or the like, the target value of the external force may exceed the allowable value of the external force. In this case, the processing unit 51 can perform control of issuing a warning for notifying the operator of such a situation. For example, when the operator sets the target value of the external force in the operation program by operating the teach pendant 37, the allowable force calculation unit 54 calculates the allowable value of the external force. When the target value of the external force input by the operator exceeds the allowable value of the external force, the processing unit 51 can display a warning on the display part. Alternatively, the processing unit 51 can notify the operator by a warning or the like. The operator can avoid setting an excessively large target value of the external force.

In addition, when the target value of the external force exceeds the allowable value of the external force during the period in which the robot 1 is driven, the operation control unit 43 can also perform control of stopping the robot 1. For example, the target value of the external force may be determined in advance in the operation program 46. In this case, the allowable force calculation unit 54 calculates the allowable value of the external force during the period in which the robot is driven. When the target value of the external force exceeds the allowable value of the external force, the operation control unit 43 can perform control of stopping the robot 1.

Figure 8:
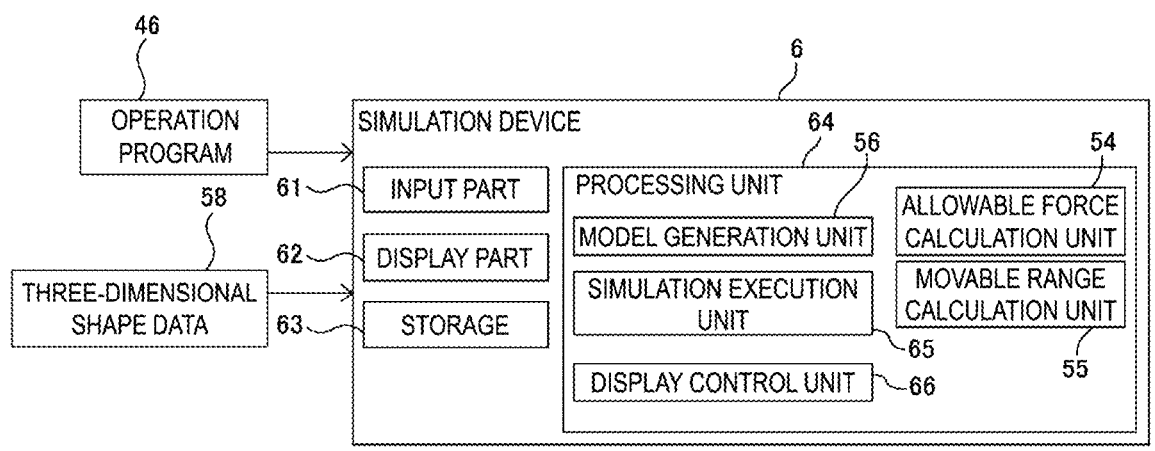
FIG. 8 is a block diagram of a simulation device according to the embodiment.

FIG. 8 illustrates a block diagram of a simulation device according to the present embodiment. The calculation device of the present embodiment can be arranged in the simulation device. A simulation device 6 arranges a three-dimensional model of the robot, a three-dimensional model of the operation tool, and a three-dimensional model of the workpiece in the same virtual space. The simulation device 6 of the present embodiment simulates the operation of the robot apparatus 5 described above.

The simulation device 6 according to the present embodiment includes an arithmetic processing device (computer) including a CPU serving as a processor. The simulation device 6 includes a storage 63 that stores any information related to the simulation of the robot apparatus 5. The storage 63 can include a non-transitory storage medium that can store information. For example, the storage 63 can include a storage medium such as a volatile memory, a nonvolatile memory, a magnetic storage medium, or an optical storage medium. A program for performing the simulation of the robot apparatus is stored in the storage 63.

The simulation device 6 includes an input part 61 for inputting information related to the simulation of the robot apparatus 5. The input part 61 includes an operation member such as a keyboard, a mouse, and a dial. The simulation device 6 includes a display part 62 that displays the information related to the simulation of the robot apparatus 5. The display part 62 can include any display panel such as a liquid crystal display panel or an organic EL display panel. When the simulation device includes a touch panel type display panel, the display panel functions as an input part and a display part.

The simulation device 6 functions as a calculation device that calculates an allowable value of an external force acting on an action point. The simulation device 6 includes a processing unit 64 that performs arithmetic processing for the simulation of the robot apparatus 5. As with the processing unit 51 of the controller 4 of the robot of the present embodiment, the processing unit 64 includes the model generation unit 56 that generates a model based on the three-dimensional shape data 58, the allowable force calculation unit 54 that calculates an allowable value of an external force, and the movable range calculation unit 55 that calculates a range in which the robot can be driven with a target value determined in advance of the external force (see FIG. 2). As with the controller 4 of the present embodiment, the three-dimensional shape data 58 of the constituent members constituting the robot apparatus and the workpiece are input to the simulation device 6 (see FIG. 2). The three-dimensional shape data 58 are stored in the storage 63.

The processing unit 64 includes a simulation execution unit 65 that simulates the operation of the robot apparatus 5. The simulation execution unit 65 has a function of driving the model of the robot apparatus. Alternatively, the simulation execution unit 65 simulates the operation of the robot apparatus 5 according to the operation program 46 generated in advance. The processing unit 64 includes a display control unit 66 that controls an image displayed on the display part 62 based on the output of simulation execution unit 65.

The processing unit 64 corresponds to a processor that is driven according to a program for performing a simulation. The processor functions as the processing unit 64 by reading the simulation program and performing control determined in the program. Each unit of the model generation unit 56, the simulation execution unit 65, the allowable force calculation unit 54, the movable range calculation unit 55, and the display control unit 66 included in the processing unit 64 corresponds to a processor that is driven according to the simulation program. The processor functions as each unit by performing the control determined in the program.

Figure 9:
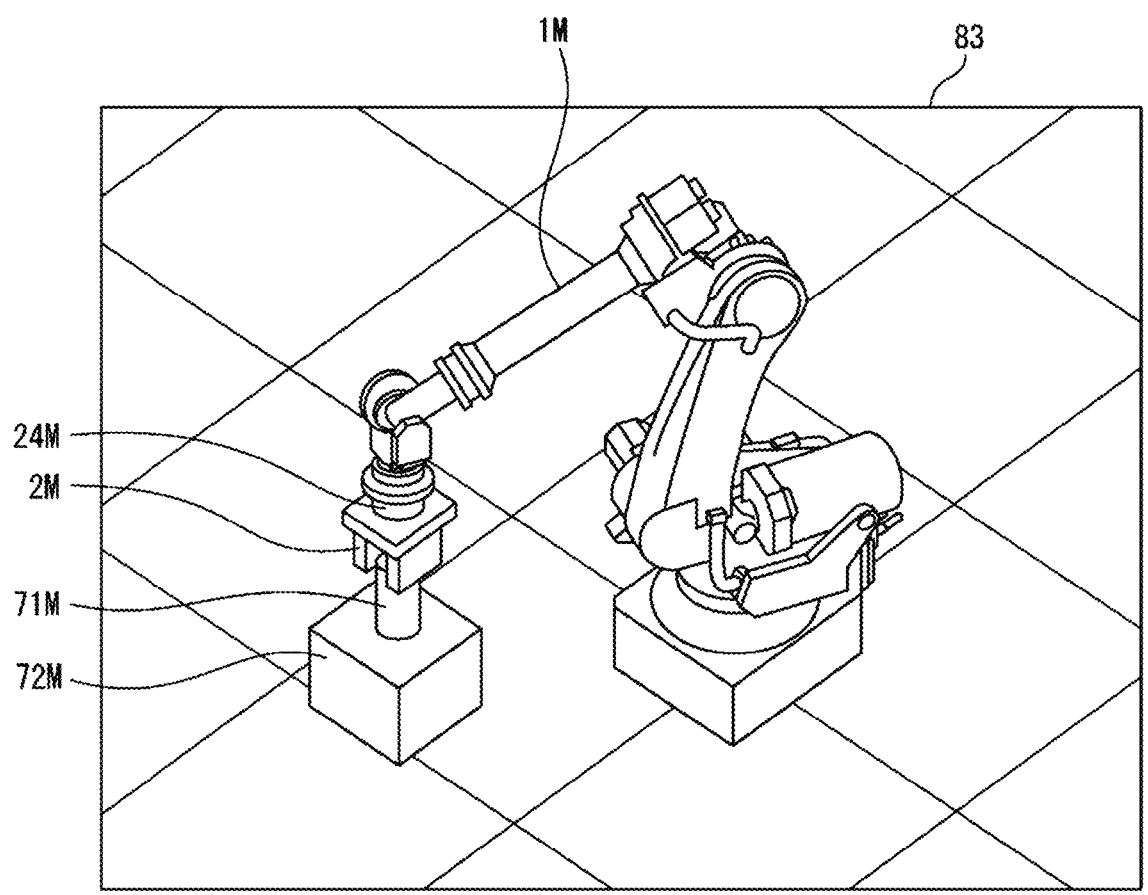
FIG. 9 is an image displayed on a display part of the simulation device.

FIG. 9 illustrates an example of an image displayed on the display part of the simulation device. The display part 62 of the simulation device 6 displays an image of a three-dimensional model as with the display part 39 of the controller 4 of the robot. The operator can input, through the input part 61, design values of a position where the robot is installed and a position where the workpiece is arranged. The position of the workpiece with respect to the robot is set in advance by the operator. In an image 83, the model 1M of the robot, the model 24M of the force sensor, the model 2M of the hand, the model 71M of the first workpiece, and the model 72M of the second workpiece are displayed.

The simulation execution unit 65 calculates the current position and orientation of the robot 1 in response to an operation on the input part 61 by the operator. Alternatively, the simulation execution unit 65 calculates the position and orientation of the robot at a predetermined time according to the operation program 46. The model generation unit generates the model 1M of the robot based on the position and orientation of the robot. According to the output of the simulation execution unit 65 and the three-dimensional model generated by the model generation unit 56, the display control unit 66 displays an image of the model on the display part 62.

The simulation device 6 can calculate an allowable value of an external force while simulating the operation of the robot apparatus 5. The position of an action point can be determined in advance and specified by the operator. The simulation can be performed by predetermining a plurality of acting directions of an external force acting on an action point. The allowable force calculation unit 54 can calculate the allowable value of the external force acting on the action point based on the position and orientation of the robot. As with the controller 4, the display part 62 of the simulation device 6 can display the allowable value of the external force calculated by the allowable force calculation unit 54 or display the region of the position of the action point calculated by the movable range calculation unit 55 (see FIG. 6 and FIG. 7).

The simulation device can perform a simulation without using an actual robot apparatus. Accordingly, when the operation program is generated offline, the allowable value of the external force can be calculated or the movable range of the action point can be calculated. The simulation device can be used for designing a system including the robot apparatus. For example, it is possible to consider positions where a robot apparatus and a peripheral device such as a stand are arranged.

The display part according to the present embodiment is a display panel arranged at the teach pendant or a display panel arranged at the simulation device. The display part may be formed by a display panel of a tablet terminal, for example. Alternatively, the display part may be formed by a display panel arranged in a personal computer. Further, the display part may be arranged in a computer that generates an augmented reality image. As the augmented reality image, for example, the allowable value of the external force can be displayed on an image of the robot apparatus captured by the tablet terminal. Alternatively, the region of the position of the action point where the current target value of the external force is equal to or less than the allowable value of the external force can be displayed so as to be superimposed on an actually captured image of the robot apparatus.

The processing unit of the simulation device of the present embodiment includes an arithmetic processing device other than the robot controller; however, the embodiment is not limited to this. The robot controller may have the function of the simulation device. In other words, a processor of the arithmetic processing device of the controller may have the function of the processing unit of the simulation device. Further, when the teach pendant includes an arithmetic processing device having a processor, the teach pendant may have the function of the simulation device. In other words, the processor of the teach pendant may function as the processing unit of the simulation device.

In the present embodiment, an action point where an external force acts is set on a workpiece; however, the embodiment is not limited to this, and the action point can be set at any position in the robot or the operation tool. Also in this case, the calculation device can calculate an allowable value of the external force acting in an acting direction at the action point.

Furthermore, in the present embodiment, a six-axis force sensor is arranged in the wrist as a force detector; however, the embodiment is not limited to this. As the force detector, any sensor capable of detecting an external force acting on an action point can be employed. For example, instead of the force sensor attached to the wrist of the robot, a torque sensor may be arranged at the joint of the robot. A plurality of torque sensors are arranged on the drive axes of the plurality of joints of the robot. Each torque sensor detects a torque around the drive axis of the joint. Alternatively, the force sensor may also be arranged on the base of the robot.

The above embodiment has described the control of fitting the workpiece having a cylindrical shape; however, the control of the present embodiment can be applied to a workpiece having any shape. The present embodiment has described the control of fitting one workpiece to another workpiece as an example; however, the embodiment is not limited to this. The controller and the simulation device of the present embodiment can be applied to a robot apparatus that performs work of bringing one workpiece into contact with another object. The fitting work is not limited to the work of inserting a workpiece into a recess or a hole. For example, the fitting work includes work of arranging a gear at a predetermined position while matching phases of teeth of the gear.

In each of the above-described controls, the order of steps can be changed appropriately to the extent that functions and effects are not changed. The above-described embodiments can be suitably combined. In each of the above drawings, the same or similar parts are denoted by the same reference numerals. It should be noted that the above-described embodiments are examples and do not limit the invention. In addition, the embodiments include modifications of the embodiments described in the claims.

REFERENCE SIGNS LIST 1 robot
2 hand
4 controller
6 simulation device
11 upper arm
12 lower arm
13 turning base
14 base
15 wrist
18a, 18b, 18c joint
24 force sensor
37 teach pendant
39, 62 display part
40 controller body
43 operation control unit
51, 64 processing unit
54 allowable force calculation unit
55 movable range calculation unit
71, 72 workpiece
73 workpiece tip point
81, 82 image
74M arrow
87M region

The invention claimed is:

1. A calculation device, comprising:
a processing unit configured to calculate an allowable value of an external force that is allowed to act on a robot, a workpiece, or an operation tool, wherein
an allowable value of a load on each constituent member among a plurality of constituent members of the robot is determined in advance, and is a value of the load that can be applied to said each constituent member of the robot, and
the processing unit is configured to calculate the allowable value of the external force in an acting direction in which the external force acts, based on
a position and an orientation of the robot,
a position of an action point on which the external force acts, and
the allowable value of the load on each constituent member among the plurality of constituent members of the robot.

2. The calculation device of claim 1, further comprising:
a display part configured to display an image of the robot, wherein
the display part is configured to display the allowable value of the external force calculated by the processing unit so as to be superimposed on the displayed image of the robot.

3. The calculation device of claim 2, wherein the display part is arranged in any of:
a tablet terminal,
a personal computer,
a teach pendant configured for an operator to manually operate the robot, or
a computer configured to generate an augmented reality image.

4. The calculation device of claim 1, further comprising:
a display part configured to display an image of the robot, wherein
the acting direction is determined in advance, and a target value of the external force acting on the action point in the acting direction determined in advance is determined in advance,
the processing unit is further configured to calculate a region of the position of the action point in which a current target value of the external force is equal to or less than the allowable value of the external force when the position and orientation of the robot are changed, and
the display part is configured to display the region of the position of the action point, in which the current target value of the external force is equal to or less than the allowable value of the external force, so as to be superimposed on the displayed image of the robot.

5. A robot controller, the controller comprising:
a calculation device; and
an operation control unit configured to control an operation of a robot,
wherein
the calculation device comprises a processing unit configured to calculate an allowable value of an external force that is allowed to act on the robot, a workpiece, or an operation tool,
an allowable value of a load on each constituent member among a plurality of constituent members of the robot is determined in advance, and is a value of the load that can be applied to said each constituent member of the robot, and
the processing unit is configured to calculate the allowable value of the external force in an acting direction in which the external force acts, based on
a position and an orientation of the robot,
a position of an action point on which the external force acts, and the allowable value of the load on each constituent member among the plurality of constituent members of the robot.

6. The robot controller of claim 5, further comprising:
a force detector configured to detect the external force acting on the action point, wherein
the operation control unit is configured to control the operation of the robot so that the external force acting on the action point is equal to or less than the allowable value of the external force.

7. The robot controller of claim 5, further comprising:
a force detector configured to detect the external force acting on the action point, wherein
the operation control unit is configured to control the operation of the robot so that the external force acting on the action point in the acting direction determined in advance reaches a target value determined in advance, and
the processing unit is configured to calculate the allowable value of the external force in the acting direction determined in advance.

8. The robot controller of claim 7, wherein
in response to an operator setting the target value of the external force that exceeds the allowable value of the external force,
the processing unit is configured to generate a warning in order to notify the operator.

9. The robot controller of claim 5, wherein
the operation control unit is configured to stop the robot in response to the target value of the external force exceeding the allowable value of the external force during a period in which the robot is driven.

* * * * *